(No Model.)
F. M. HUNT.
MOWING MACHINE.
No. 386,015. Patented July 10, 1888.
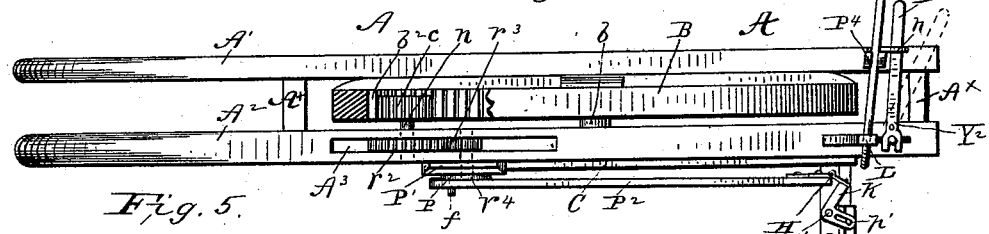
Witnesses,
John S. Finch Jr.
Chas. D. Jost.
Inventor,
Frank M. Hunt.
By his Attorney
C. W. Alexander.

UNITED STATES PATENT OFFICE.

FRANK M. HUNT, OF ROUND OAK, GEORGIA.

MOWING-MACHINE.

SPECIFICATION forming part of Letters Patent No. 386,015, dated July 10, 1888.

Application filed May 9, 1887. Serial No. 237,596. (No model.)

*To all whom it may concern:*

Be it known that I, FRANK M. HUNT, a citizen of the United States, residing at Round Oak, in the county of Jones and State of Georgia, have invented certain new and useful Improvements in Mowing-Machines, of which the following is a specification, reference being had therein to the accompanying drawings.

My invention relates to mowing-machines, it having particular reference to that class or character of machines which employ but one ground-wheel, which serves to operate the cutting apparatus through the medium of suitable gearing and a pitman-rod; and its nature will be fully understood from the following description and claims, when taken in connection with the annexed drawings, in which—

Figure 1 is a plan view of my improved mower. Fig. 2 is a side elevation of the same, showing the handles broken away, and the cutting apparatus in section on the line indicated by dotted line X X, Fig. 1. Fig. 3 is a detail view, partly in side elevation and partly in section, of the adjusting device for the cutting apparatus; Fig. 4, a vertical transverse sectional view taken on line X' X' on Fig. 1, and looking in the direction indicated by the arrow; Fig. 5, a detail view of the device used for assisting to retain the vertically-vibrating thrust-bar upon its pivot; and Fig. 6 is a slightly-enlarged horizontally-sectional view taken on line $y\ y$, Fig. 4.

Referring to the annexed drawings by letter, A designates the frame of the machine, which is composed of the two parallel beams A' A², provided at their rear ends with suitable handles, and connected rigidly together by cross-bars A$^\times$ at their rear and forward ends. Between the parallel beams of the frame, on the transverse shaft $b$, is journaled the ground-wheel B, which is internally toothed, as shown at $b^2$. The beam A² is vertically and longitudinally slotted at A³, and in this slot is located the spur-wheel $r^2$, the shaft $n$ of which passes transversely through the beam and is extended a short distance beyond the inner side of the same, and has secured to it another spur-wheel, $c$, which intergears with the internal teeth upon the ground-wheel, as clearly shown in Fig. 1. Engaging with the spur-wheel $r^2$, and also located in the slot A³, is the spur-wheel $r^3$, the transverse shaft $r^4$ of which also passes through the beam A² and is extended a short distance beyond the outer side of the same. By this arrangement of spur-wheels it will be observed that as the ground-wheel revolves the spur-wheel shaft $r^4$ will have imparted to it a rapid rotary motion.

Secured to the outer face of the beam A², preferably in a recess therein, is a flat metallic spring tongue or plate, $t$, which is perforated for the free passage of the shaft $r^4$, and is provided on its outer face with the annular bushing $c^6$, through which the said shaft passes freely. Upon this annular bushing is pivoted a vertically-vibrating thrust-bar, C, which is perforated for the passage of the bushing, and is held upon the same by means of the bifurcated retaining-plate P', which is bolted to the face of the beam A². The two depending arms of this bifurcated plate are disposed on each side of the shaft $r^4$, and press against the face of the thrust-bar C and prevent the same from slipping off the bushing. The normal tendency of the spring-plate $t$ being to spring outwardly, the result will be to clamp the thrust-bar between it and the retaining-plate P', and thus prevent undue rattling and compensate for wear of the parts. Secured upon the outer end of the shaft $r^4$ is a crank-disk, P, to the eccentric wrist-pin $f$ of which is attached a pitman-rod, P², which operates the cutter-bar. The lower end of this pitman is attached by a hinge, H, to one arm of a bell-crank lever, K, the fulcrum of which is at $f'$. The other arm of this bell-crank lever is attached to the cutter-bar R by means of a pin, $p'$, which passes through a slot in the arm of the lever. The cutter-bar is applied to and guided by a finger-bar, S, the inner end of which is rigidly secured to the lower end of the vertically-vibrating thrust-bar C. The lower or forward end of this thrust-bar C has pivoted to it a notched bar, L, which passes up freely through a slot in the forward end of the beam A². Engaging with the notched bar L as it passes vertically through the slot in the beam is a spring-actuated sliding bolt, $s$, which is held in a recess in the top of the beam by means of a slotted cap-plate. This spring-actuated bolt is provided with a vertical pin, which passes freely through the slot in the cap-plate and is thereby guided. Engaging with the pin on the sliding bolt s, whereby the same is operated, is a lever, L', which is fulcrumed at Y² on the beam A².

The beam A' has rigidly erected on it, near its forward end, a post, P⁴, in the upper forked end of which is fulcrumed a lever, Y, one end of which engages with the upper end of the notched bar L by passing through a hole in the same, whereby this lever may be elevated or depressed, as occasion may require. Pivoted to the post P⁴ is a hook, h, which is adapted to engage the handle end of the lever L' when the same is adjusted to hold the sliding bolt out of engagement with the notched bar L, as shown clearly in Fig. 3.

By means of the lever Y the entire cutting apparatus may be readily adjusted vertically, and by means of the spring-actuated sliding bolt s, which engages with the notched bar L, the cutting apparatus will be held in any position desired. When it is desired to disengage the sliding bolt from the notched bar L, the pivoted hook h is caused to engage with the free end of the lever L'.

Having thus fully described my invention, what I claim as new, and desire to secure by Letters Patent, is—

1. The combination, in a mower, of the frame, the internally-toothed ground-wheel supporting the said frame, the spur-wheels c' and r², journaled in the frame, the spur-wheel r³, engaging with the spur-wheel r², the spring-plate t, secured to the frame and provided with a bushing upon its face, through which the outer end of the shaft of the spur-wheel r³ passes, the retaining-plate P', secured to the frame and provided with depending arms, the thrust-bar C, pivoted upon the bushing upon the spring-plate and having attached to it the finger-bar S, the upper end of this bar being clamped between the spring-plate t and the arms of the retaining-plate P', and the cutting apparatus connected to and operated by the shaft of the said spur-wheel r³, substantially as described.

2. In a mower, the combination of the frame mounted upon an internally-toothed ground-wheel, the spur-wheel r³, journaled in the frame, the spur-wheels r² and c', the spring-plate t, bolted to the frame and perforated for the passage of the shaft of the spur-wheel r⁴, and provided with a bushing through which the said shaft passes, the retaining-plate P', bolted to the frame and provided with depending arms, the vertically-vibrating thrust-bar C, pivoted upon the bushing of the spring-plate and clamped between the same and the arms of the retaining-plate, the finger-bar attached to the bar C and carrying the cutting apparatus, the pitman-rod and crank-disk for operating the cutting apparatus, the notched bar L, pivoted to the lower end of the said thrust-bar C, the lever Y, for adjusting the said bar L, the spring-actuated bolt s, for engaging the notches in the bar L, and the lever for disengaging the said bolt s.

In testimony whereof I affix my signature in presence of two witnesses.

FRANK M. HUNT.

Witnesses:
ANN E. HASCALL,
FRANCIS B. HASCALL.